(12) United States Patent
Bloch (10) Patent No.: US 11,189,006 B2
(45) Date of Patent: Nov. 30, 2021

(54) MANAGING DATA FOR TRANSPORTATION (71) Applicant: DISPLAYLINK (UK) LIMITED, Cambridge (GB)

(72) Inventor: Cezary Boguslaw Bloch, Katowice (PL)

(73) Assignee: DISPLAYLINK (UK) LIMITED, Cambridge (GB)

( * ) Notice: Subject to any disclaimer, the term of this patent is extended or adjusted under 35 U.S.C. 154(b) by 0 days.

(21) Appl. No.: 16/957,072

(22) PCT Filed: Dec. 17, 2018

(86) PCT No.: PCT/GB2018/053646
§ 371 (c)(1),
(2) Date: Jun. 22, 2020

(87) PCT Pub. No.: WO2019/122834
PCT Pub. Date: Jun. 27, 2019

(65) Prior Publication Data
US 2020/0342566 A1    Oct. 29, 2020

(30) Foreign Application Priority Data

Dec. 22, 2017  (GB) ..................................... 1721762

(51) Int. Cl.
*G06T 1/60* (2006.01)
*G06F 12/0875* (2016.01)
(Continued)

(52) U.S. Cl.
CPC ............ *G06T 1/60* (2013.01); *G06F 12/0875* (2013.01); *G06T 1/20* (2013.01); *G09G 5/14* (2013.01);
(Continued)

(58) Field of Classification Search
CPC ......... G06T 1/60; G06T 1/20; G06F 12/0875; G06F 2212/608; G06F 3/14; G06F 5/10;
(Continued)

(56) References Cited

U.S. PATENT DOCUMENTS

| 7,194,140 | B2* | 3/2007 | Ito ........................ H04N 1/3333 |
| | | | 358/1.16 |
| 2009/0003714 | A1* | 1/2009 | Subramaniam ...... H04N 19/426 |
| | | | 382/232 |

(Continued)

FOREIGN PATENT DOCUMENTS

| CN | 101 931 588 A | * 12/2010 | ............... H04L 1/00 |
| EP | 2670098 A1 | 12/2013 | |

(Continued)

OTHER PUBLICATIONS

PCT Notification of Transmittal of the International Search Report and the Written Opinion of the International Searching Authority, or the Declaration, Application: PCT/GB2018/053646, dated Feb. 21, 2019.

*Primary Examiner* — Maurice L. McDowell, Jr.
*Assistant Examiner* — Donna J. Ricks
(74) *Attorney, Agent, or Firm* — Paradice & Li LLP (57) ABSTRACT

Managing data for transportation is provided via storing data at a host device, where the data is processed and encapsulated into transport units having a maximum size. The data is divided and processed into processed portions of varying size. The processed portions are stored sequentially into an output buffer to form the transport units, with a potential start field space left between each processed portion. A set of processed portions stored in the output buffer is determined based on sizes of the processed portions, the set starting after a previous actual start field where the set has a size less than the maximum size and a potential start field space after a last of the processed portions in the set is (Continued)

replaced by an actual start field to define the set. Sets of processed portions delimited by actual start fields may then be output.

19 Claims, 7 Drawing Sheets

(51) Int. Cl.
    *G06T 1/20*     (2006.01)
    *G09G 5/14*     (2006.01)
    *G09G 5/393*     (2006.01)
    *G09G 5/395*     (2006.01)

(52) U.S. Cl.
    CPC .............. *G09G 5/393* (2013.01); *G09G 5/395* (2013.01); *G06F 2212/608* (2013.01); *G09G 2340/02* (2013.01); *G09G 2350/00* (2013.01); *G09G 2370/00* (2013.01)

(58) Field of Classification Search
    CPC .......... G09G 5/14; G09G 5/393; G09G 5/395; G09G 2340/02; G09G 2350/00; G09G 2370/00; H04N 21/23605; H04N 19/436; H04L 49/9021
    See application file for complete search history.

(56) References Cited

U.S. PATENT DOCUMENTS

2014/0334557 A1* 11/2014 Schierl ................ H04N 19/169
    375/240.27
2017/0221182 A1* 8/2017 Cawley .................. G06T 3/602

FOREIGN PATENT DOCUMENTS

| WO | 2017048381 A1 | 3/2017 | |
|---|---|---|---|
| WO | WO 2018/144233 A1 * | 8/2018 | ............... H04L 1/00 |
| WO | 2019122834 A1 | 6/2019 | |

* cited by examiner

MANAGING DATA FOR TRANSPORTATION

CROSS-REFERENCE TO RELATED APPLICATIONS

This Application is a National Stage Entry filed under 35 U.S.C. § 371 of PCT/GB2018/053646, filed Dec. 17, 2018, which claims priority to Great Britain Application No. 1721762.1, filed Dec. 22, 2017, all of which are assigned to the assignee hereof. The disclosures of all prior Applications are considered part of and are incorporated by reference in this Patent Application.

BACKGROUND

This invention relates to a method and device of managing data, for example image data, which may be compressed, to arrange it for transportation, for example across a bandwidth limited transport connection to an output display, such as a display device.

It is common for data, such as image or audio data to be processed after being generated, to prepare it for transport to a destination. For example, a colour image may first be subjected to a colour transform to transform the colour information (e.g. RGB values) into a different colour domain (e.g. YUV or YCbCr). The colour information is then subjected to a mathematical transform (such as the Discrete Cosine Transform, or a Haar transform) to produce a series of coefficients. These coefficients are then quantized (effectively divided by predetermined numbers) and then entropy encoded, to further reduce the amount of data that is actually transmitted. At the receiving end, the data is decompressed by performing reverse quantization and reversing the chosen transform to reconstruct the original block. The aim of entropy encoding is to assign optimal variable-length codes to different symbols according to their frequency in the stream, so a symbol that appears frequently in the stream will have a shorter code than a symbol that appears less frequently. This reduces the overall volume of the data in transmission.

If the portions of data are of different sizes, then allowance must be made for all the portions, of whatever size, to be stored in the output buffer in the correct sequence. In a known technique, in relation to image data, the output buffer is divided into areas, each of a size sufficient to store a maximum size of the processed (in this case, compressed) data. Since the transport units have a maximum size, a predetermined number of the areas of the output buffer are therefore designated for each transport unit.

As will be appreciated, a considerable amount of space in the output buffer is therefore wasted, and some transport units may end up with somewhat less data than they could have due to the need to make sure there is sufficient size for all the portions of data, even if there sizes are not known prior to processing.

It is therefore an object of the invention to alleviate the problems mentioned above.

SUMMARY

Accordingly, in a first aspect, the present invention provides a method of managing data, the method comprising:
receiving an amount of data at a host device, wherein the data is to be processed and encapsulated into transport units having a maximum size for transport over a transmission medium to a client device;
storing the data in an input buffer, the data being divided into a plurality of portions;
processing each portion of data into processed portions of data of varying size;
storing the processed portions sequentially into an output buffer to form the transport units, wherein processed portions are stored with a potential start field space left between processed portions in the output buffer;
determining a set of the sequential processed portions stored in the output buffer, the sequence starting after a previous actual start field wherein the set has a size that does not exceed the maximum size for a transport unit, based on sizes of the sequential processed portions stored in the output buffer, wherein the set comprises at least one processed portion; and
replacing a potential start field space after a last of the sequential processed portions in the determined set by an actual start field to define the set of sequential processed tiles as being of less than the maximum size for a transport unit;
wherein the sets of processed portions in the output buffer delimited by actual start fields may be output over the transmission medium.

In a preferred embodiment, determining the set of the sequential processed portions comprises, after each processed portion is stored in the output buffer:
determining whether a size of the newly processed portion stored in the output buffer, together with the sizes of previously stored sequential processed portions stored in the output buffer after a previous actual start field exceeds the maximum size for a transport unit, and, if it is determined that the size of the newly processed portion stored in the output buffer, together with the sizes of previously stored sequential processed portions stored in the output buffer after a previous actual start field exceeds the maximum size for a transport unit, then replacing the potential start field space immediately prior to the newly processed portion stored in the output buffer with the actual start field.

In an embodiment, determining the set of the sequential processed portions comprises:
starting at an actual start field, determining a cumulative size of the sequential processed portions, until the cumulative size exceeds the maximum size for a transport unit; and
replacing, with the actual start field, the potential start field space immediately prior to a last processed portion stored in the output buffer whose size was added to the cumulative size to cause the cumulative size to exceed the maximum size of the transport unit.

Preferably, the method further comprises storing information in a memory, the information indicating, for each set of sequential processed portions, a position of each actual start field for the set, and a position of an end of the set in the output buffer.

The portions of data are preferably divided into groups, wherein each portion of data of each group is processed sequentially and stored in the output buffer sequentially in a section of the output buffer, and wherein each group of portions of data is processed in parallel and stored in a separate section of the output buffer.

Preferably, the data comprises display data, the amount of data comprises a frame of image data, the client device is a display device for displaying the frame of image data and the method is performed at a Graphics Processing Unit, GPU.

In one embodiment, processing comprises processing using an encoding algorithm to provide an encoded portion of data, wherein the start field preferably comprises a header.

According to a second aspect the invention provides a processing unit comprising a processor configured to perform the method described above. Preferably, when the data comprises display data, the processing unit may be a Graphics Processing Unit, GPU.

According to a third aspect, the invention provides a host device comprising such a GPU, a CPU and an output transport mechanism.

In one embodiment, the CPU is configured to encapsulate the sets of portions of encoded display data into transport units and to output the transport units to a display device over the bandwidth limited transmission medium.

According to another aspect, the invention provides a system for managing display data comprising such a host device and a display device coupled to the host device by the bandwidth limited transmission medium, wherein the display device comprises means configured to:

receive the encoded portions of display data via the transport medium from the host device;

decode the encoded portions of display data; and output the display data for display.

Preferably, the display device comprises a pair of display panels for displaying the frame of display data, wherein the display device and the pair of display panels are incorporated in a wearable headset.

The wearable headset preferably comprises a virtual reality or an augmented reality headset.

In this way, the output buffer is easily compacted with an appropriate amount of processed/compressed data to maximize the size of each transport unit, so as to facilitate the encapsulation of the transport unit.

BRIEF DESCRIPTION OF THE DRAWINGS

Embodiments of the present invention will now be described, by way of example only, with reference to the accompanying drawings, in which:—

DETAILED DESCRIPTION OF THE DRAWINGS

Figure 1:
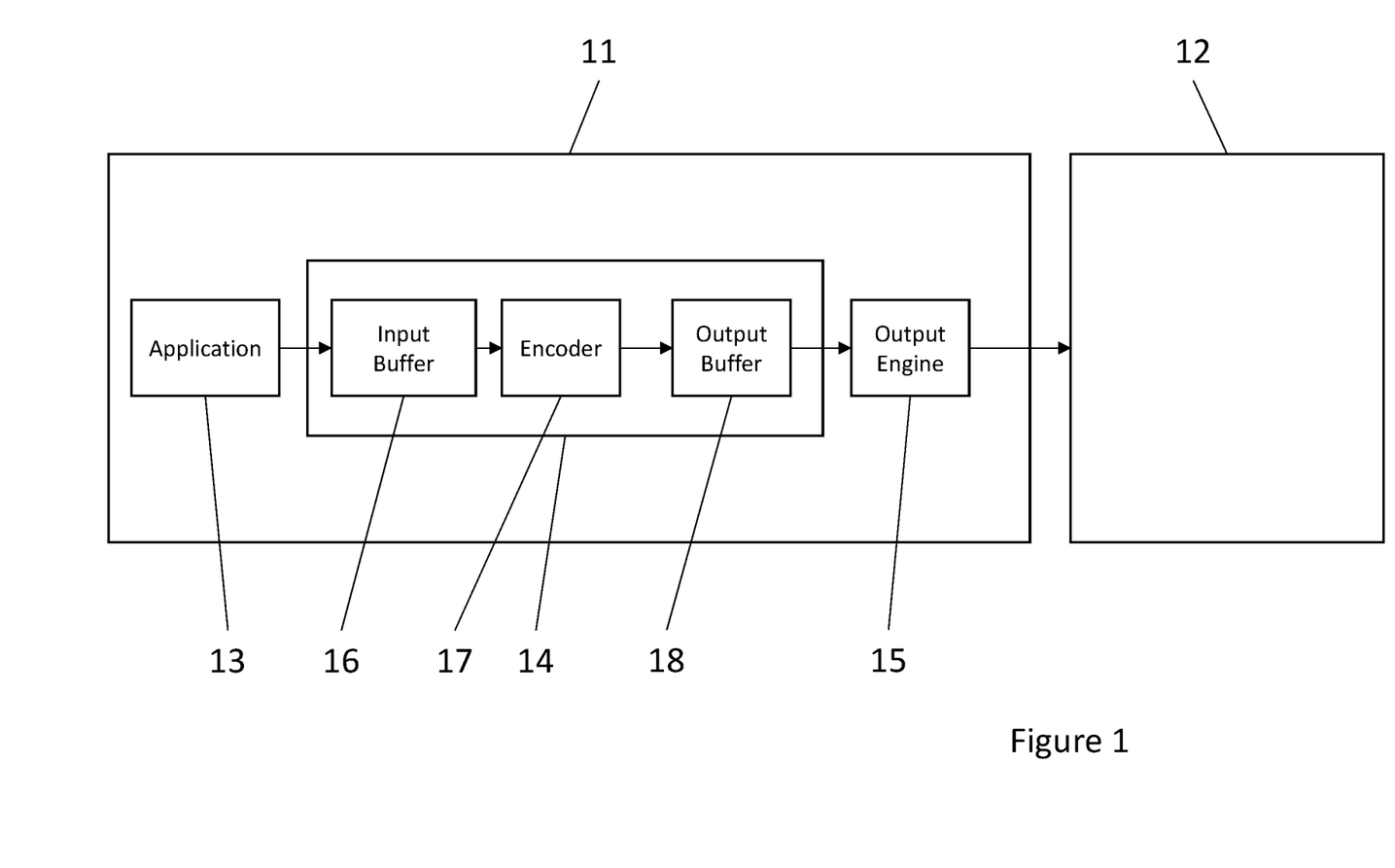
FIG. 1 shows a block diagram of a system that may utilise an embodiment of the invention.

Thus, FIG. 1 shows a system comprising a host computing device [11] and a client device [12]. The host computing device [11] contains several engines [13, 14, 15] which generate and process data for transmission to the client device [12]. There may be other internal engines and areas of memory in each device [11, 12], including engines on the client device [12] for decoding, decompressing, decrypting, and otherwise reversing reversible processing carried out on the data in the execution unit [14] of the host device [11], but for clarity they are not shown here.

The data may, for example, be display data for display on a display device connected to or integrated into the client device [12], which may be a display control device capable of outputting the data for display and therefore connected to a display device. The display device may be a single display panel such as a television or desktop monitor or multiple panels which may be separated by optical elements. The display device may also be a head-mounted device such as a virtual-reality or augmented-reality headset, and accordingly the display control device [12] may be co-located with the display device such that they share a single housing.

Alternatively, the data may be bulk data being transmitted to the client device [12] for further processing or storage, audio data being transmitted to the client device [12] to be played through speakers or headphones connected to the client device [12], or any combination of types of data.

The host computing device [11] first includes an application [13] which produces data and instructions for how it should be manipulated to produce an appropriate output for transmission to the client device [12]. It may be running on a general-purpose processor such as a Central Processing Unit (CPU) on the host computing device [11]. The application [13] is connected to an execution unit [14] which performs further processing and manipulation on the data as appropriate for its type. For example, if the data is display data the execution unit [14] may be a Graphics Processing Unit (GPU), or it may be a general-purpose processor such as a CPU, or a dedicated processing engine with a limited purpose.

For the purposes of this embodiment of the invention, the processing comprises encoding, which includes compression of the data. Due to the nature of most compression algorithms, the processed portions of data output by the execution unit [14] are of varying sizes even where the input portions of data are all the same size. This is an example only and other processing may be carried out such as scaling, defragmentation, encryption, etc.

The execution unit [14] includes an input buffer [16] in which the received data is divided into portions for processing, an encoder [17], and an output buffer [18]. Naturally, there may be other processing engines if alternative or multiple processes are carried out on the data, and the encoder [17] may not be a separate engine but a program run in the execution unit [14].

The execution unit [14] is connected to an output engine [15], which fetches encoded data from the output buffer [18] and transmits it to the client device [12] using a wired or wireless connection. The output engine [15] may also actually comprise a program running on a general-purpose processor such as a CPU.

The application [13], execution unit [14], and output engine [15] are here shown as separate modules, but they may be combined; for example, the application [13] may perform its own encoding, meaning that it comprises both the application [13] and execution unit [14] as described here.

Figure 2:
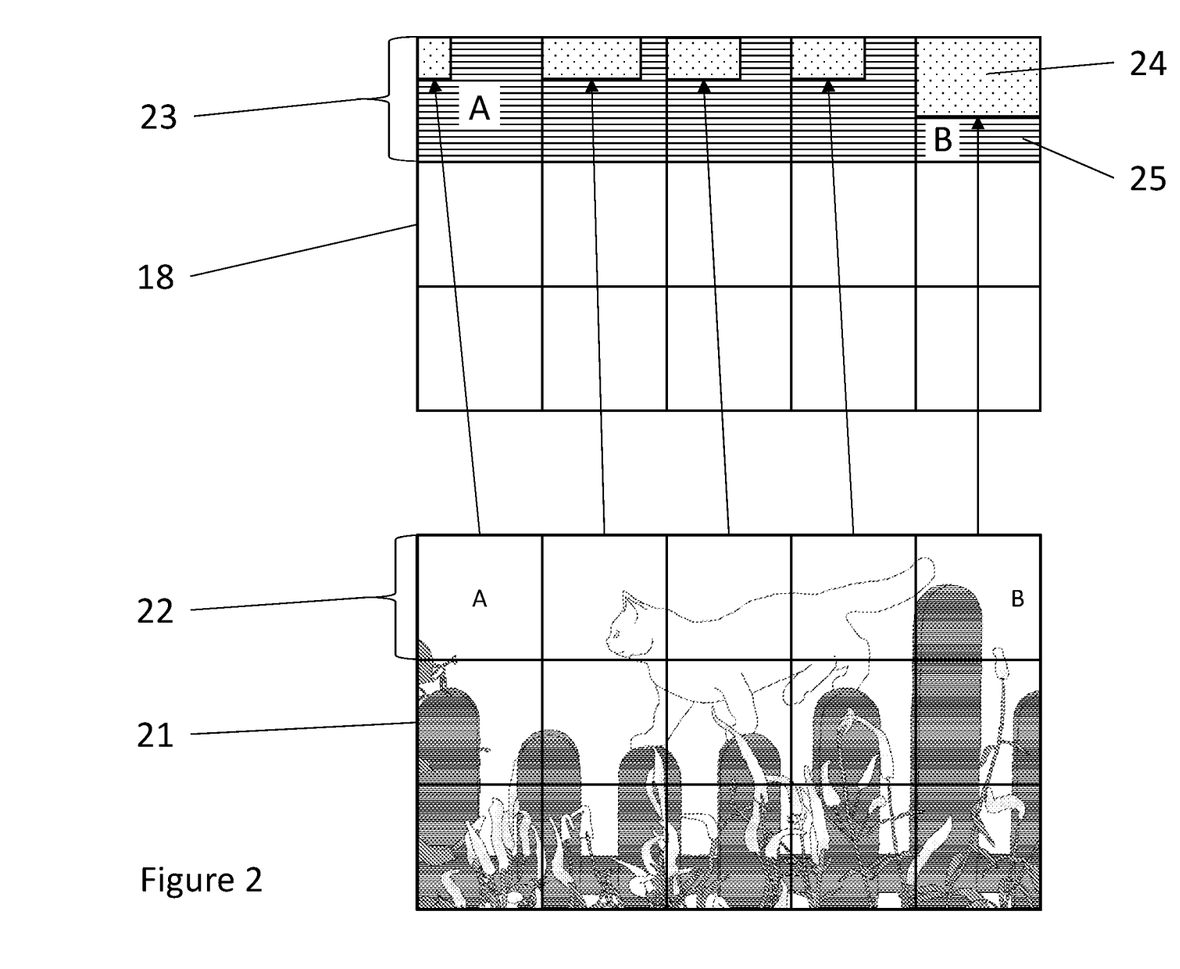
FIG. 2 shows a schematic diagram of how a frame of display data is output to the output buffer in a known system.

FIG. 2 shows the results of processing according to known art in a system such as that shown in FIG. 1. In this example, the data is a frame of display data [21] produced by the application [13] and divided into tiles or tile groups [22]: geometrically-shaped portions of display data which can be processed as independent units. The tiles [22] are represented by a grid superimposed on the image [21] in the Figure and are encoded as separate portions of data.

Processed portions of data [24] are stored in the output buffer [18] in a format with specific offsets, here also represented by a grid. Each tile [22] is fetched by the encoder [17], encoded independently of the other tiles [22], and placed in its designated location [23] in the output buffer [18]. The tiles [22] are shown in the Figure to all be the same size, though in practice they may be different sizes; for example, the size of the frame [21] may not be evenly divisible, resulting in a row or column of smaller tiles [22] along one side. This does not affect the encoding or storing processes.

The format of the output buffer [18] can result in significant wasted space [25], since the system must assume the worst case and allot a large area of memory [23] for each encoded tile [24]. The memory used [25] is shown hatched with horizontal lines. In a case where the encoding process significantly reduces the volume of the data, such as the top-left tile [22A], which corresponds to the top-left area [23A] of the output buffer [18], allotted memory that is not used [25] is wasted as the small amount of encoded data [24] requires as much memory [23] to be allocated as a tile [22] that has a much larger volume after compression, such as the top-right tile [22B], which corresponds to the top-right area [23B] of the output buffer [18]. This waste is propagated to the transmission mechanism, since each portion of processed data [24] is either transmitted in its own packet or must be copied into a separate buffer before it can be prepared for transmission, adding another step to the processing as well as requiring additional memory access, which takes time and therefore slows down the production and transmission of the data.

Figure 3:
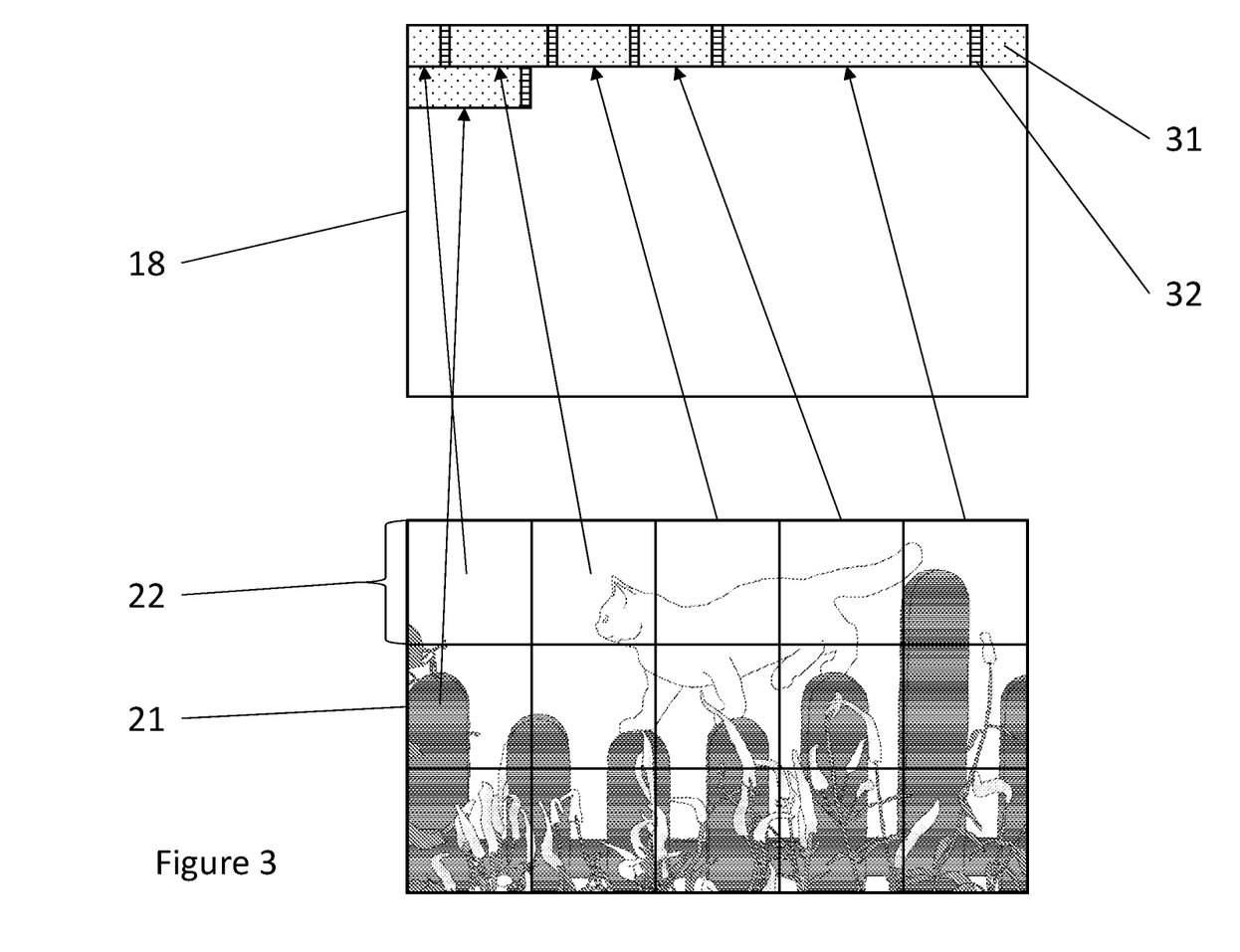
FIG. 3 shows a schematic diagram of how a frame of display data is output to the output buffer according to an embodiment of the present invention.

FIG. 3 shows the results of processing according to an embodiment of the invention in a system such as that shown in FIG. 1, using the same example frame [21] of display data as input as that shown in FIG. 2. In this embodiment, processed portions of data [31] are stored in the output buffer [18] without specific offsets and therefore the output buffer [18] does not have allocated areas per tile [22]. This is shown by the removal of the grid from the output buffer [18] compared to FIG. 2.

In some embodiments, portions of data from a single input, in this case the frame [21], may be divided into groups and each portion of data in each group processed sequentially. The output buffer [18] may also be divided into multiple sub-buffers each containing data from a respective group. This improves parallel processing since each group can be processed in parallel and the data stored sequentially in its respective sub-buffer, each sub-buffer acting in the same way as the full output buffer [18] herein described. The output buffer [18] may also be part of a shared memory which is also used for other purposes.

In a system according to the invention, tiles [22] are encoded and put in the output buffer [18] in a similar way to the conventional system shown in FIG. 2, but instead of each portion of processed data [31] being placed in an allocated area of memory [23], the data is stored sequentially such that only a small gap [32] is left between portions [31]. This means that only the area of memory shaded with horizontal lines is allocated and unused, so there is likely to be significantly less wasted space either in the memory itself or in the eventual packets used for transmission to the client device [12]. Even in the case where encoding does not significantly reduce the volume of the data and the same space that would have been allocated for the worst-case scenario is used, the processed portions of data [31] are prepared for transport when they are first written to the output buffer [18], reducing the need for additional processing and memory access.

The portions of data [22] may be processed serially in an order such as—in this example—left to right and top to bottom. Alternatively, they may be processed in parallel using, for example, multiple processing cores in the encoder [17] which each fetch the next portion in a sequence and encode it, then write the encoded portion of data at the end of the set of sequential portions of processed data in the output buffer [18] before fetching and encoding the next portion of data from the input buffer [16].

The space left [32] between portions of processed data [31] in the output buffer [18] is enough to contain the start field of a Transport Unit (TU), and therefore is known as a potential start field space or potential TU header, as a TU header could be copied into this space if the next portion of data would be at the beginning of a new TU.

This method has been described using display data as an example input, but as previously mentioned any other type of data could be processed and stored in the same way, provided it is capable of being divided into portions.

Figure 4:
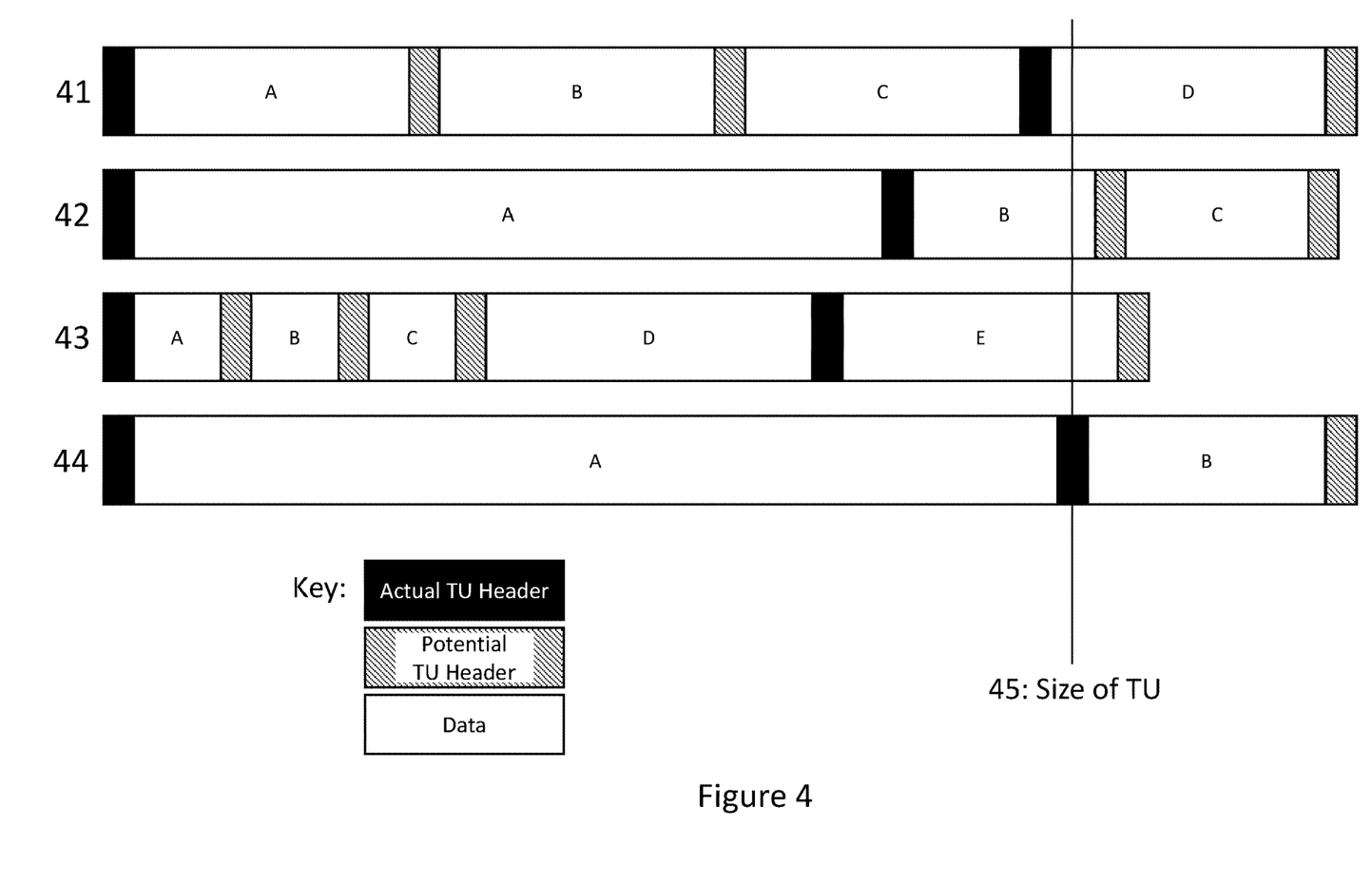
FIG. 4 shows a collection of the data from FIG. 3 in more detail.

FIG. 4 shows a collection of sets of portions of data [41, 42, 43, 44], each showing potential and actual TU headers depending on the sizes of the different portions of data. These may be separate sub-buffers as previously mentioned, or they might be arranged end-to end in a single output buffer [18], but for clarity they are here shown separately and arranged vertically. The maximum size of a TU [45] is indicated with a vertical line in order to show how the set of data portions to go into each TU is determined. Portions of processed data are represented by white boxes, actual TU headers are represented by black boxes, and potential TU headers are indicated using diagonal hatching.

The first set [41] contains four portions of data [41A, 41B, 41C, 41D] of equal size. Portion 41A begins with an actual TU header because it is the first portion in the TU. It ends with a potential TU header, after which Portion 41B has been put into the memory, and likewise Portion 41C. Portion 41D, however, would make the set larger than the predetermined maximum size for a TU [45] and therefore an actual TU header is put into the potential TU header space left at the end of Portion 41C. This means that the first TU contains three portions of data [41A, 41B, 41C], while in the conventional system an analogous unit might only contain one portion of data or the portions of data might need to be copied into further buffers to be prepared for transmission.

The second set [42] begins with a single large portion of data [42A] followed by two smaller portions [42B, 42C]. However, both the first [41A] and second [42B] portions begin with actual TU headers because Portion 42B was just large enough that the combination of Portions 42A and 42B was larger than the predetermined maximum size of a TU [45]. The potential TU header between Portion 42B and Portion 42A has therefore been replaced with an actual TU header and Portions 42B and 42C form a separate TU.

The third set [43] contains three small portions of data [43A, 43B, 43C] followed by two larger portions [43D, 43E]. Naturally, Portion 43A begins with an actual TU header, and Portions 43A, 43B, and 43C are all followed by potential TU headers, but if Portion 43E were added to the TU that begins with Portion 43A that TU would be larger than the predetermined maximum size of a TU [45]. The potential TU header at the end of Portion 43D has therefore been replaced with an actual TU header at the beginning of Portion 43E, which in turn ends with its own potential TU header.

The fourth set [44] has two portions of data of which Portion 44A is very large and occupies the whole TU by itself. It is therefore followed by an actual TU header at the beginning of Portion 44B.

Figure 5:
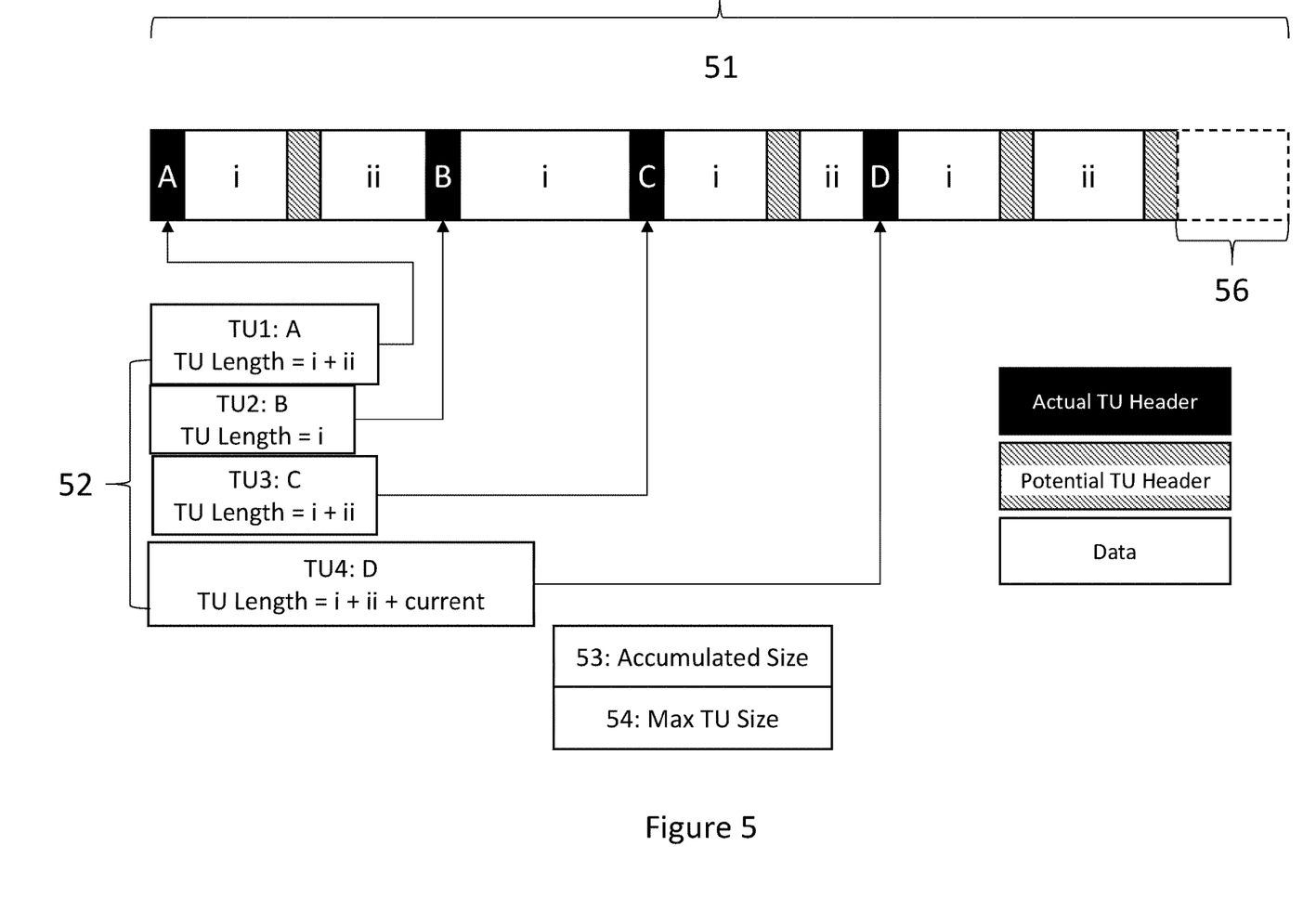
FIG. 5 shows a number of portions of processed data in an output buffer.

FIG. 5 shows a number of portions of processed data [51] in an output buffer [18], comprising four TUs [51A, 51B, 51C, 51D], together with other values stored in memory [52, 53, 54] in order to demonstrate the implementation of the sequential storage.

At the top of the Figure, four TUs [51] are shown stored sequentially in an output buffer [18]. Each TU begins with an actual TU header, represented by a black box in accordance with the convention established in FIG. 4. Also in accordance with that convention, portions of processed display data are represented with white boxes and potential TU headers are represented by boxes hatched with diagonal lines.

Each actual TU header is referenced by a pointer [52] stored in a separate memory to allow access to that TU by the output engine [15] when the data is transmitted to the client device [12]. In this example, each pointer [52] stores the offset of each TU [51] from the beginning of the output buffer [18], with the last pointer [52D] referencing the TU that is currently being added to [51D]. There may also be pointers to the end of each TU or indications of the locations of the ends of the TUs may be otherwise stored or calculated; this may include storing the size of each TU with the relevant pointer [52]. The separate memory also contains two other values. The first [53] is an accumulated size variable which contains the total size in memory of the TU currently being filled [51D]; i.e. the amount of space in memory occupied by data added after the last actual TU header. The second other value [54] stored in the separate memory is the maximum TU size. This is predetermined depending on the protocol used for transmission. It is commonly a constant and is notified to the output engine [15] and execution unit [14] upon setup of the connection to the client device [12].

The final portion of processed data [56] is outlined with dashes. This is to represent the fact that this portion of data [56] is newly processed and stored in memory and the system has not yet determined whether it should begin a new TU, as will be explained in the process shown in FIG. 6.

Figure 6:
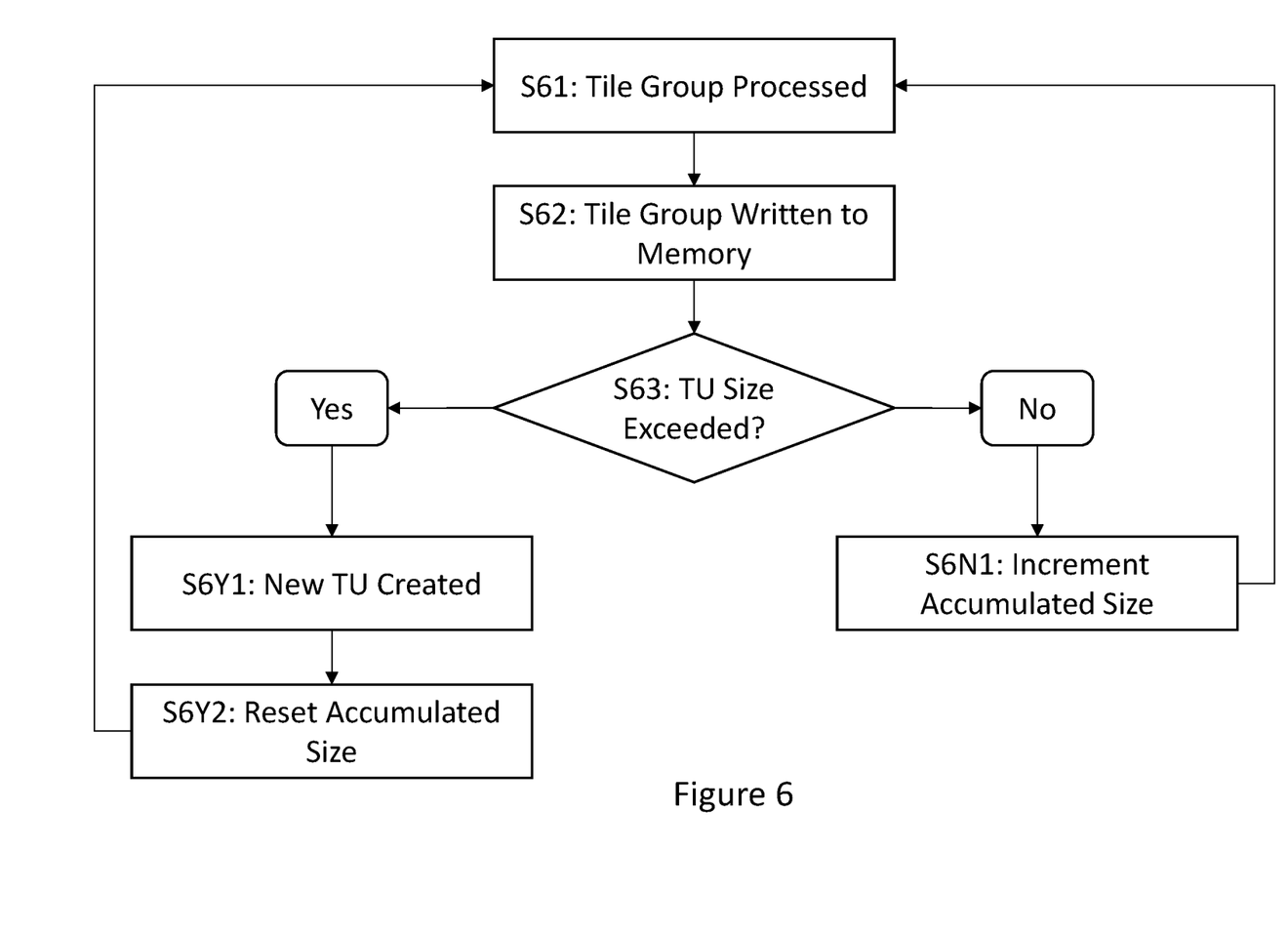
FIG. 6 shows a flow diagram of an embodiment of the invention.

FIG. 6 shows the process followed by an embodiment of the invention, with reference to FIG. 5.

At Step S61, a portion of data such as a tile or tile group [22] is processed. In a system such as that shown in FIG. 1, this means that it is fetched from the input buffer [16] and encoded in the encoder [17].

At Step S62, the processed portion of data [56] is written into the output buffer [18]. According to a conventional method such as that shown in FIG. 2, it would be written into an allocated area [23] of the output buffer [18] and the remainder of the allocated space [25] in that area left empty, but in a system according to the invention such as that shown in FIG. 3 all the portions [31] of processed data are written into the output buffer [18] sequentially. This means that a potential start field space is left after the previous portion of display data [51Dii] and then the new data [56] is written into the output buffer [18] immediately after that gap. This is the processed portion of data outlined with dashes in FIG. 5.

At Step S63, the accumulated size [53]—i.e. the size of the current TU [51D]—is compared to the maximum TU size [54]. If the accumulated size [53] is greater than the maximum TU size [54], the potential start field space between the previous portion [51Dii] and the new portion [56] is replaced with an actual TU header, meaning that the set of processed portions between this new actual TU header and the previous actual TU header [51D] is a complete TU and a new TU is created containing only the new processed portion [56] (Step S6Y1). The accumulated size [53] is also reset to be only the size of the new processed portion [56] (Step S6Y2).

If the predetermined maximum TU size [54] has not been exceeded, the potential start field space is left as it is and the accumulated size [53] is simply incremented by the size of the new portion [56].

In both cases, the process then returns to Step S61.

Figure 7:
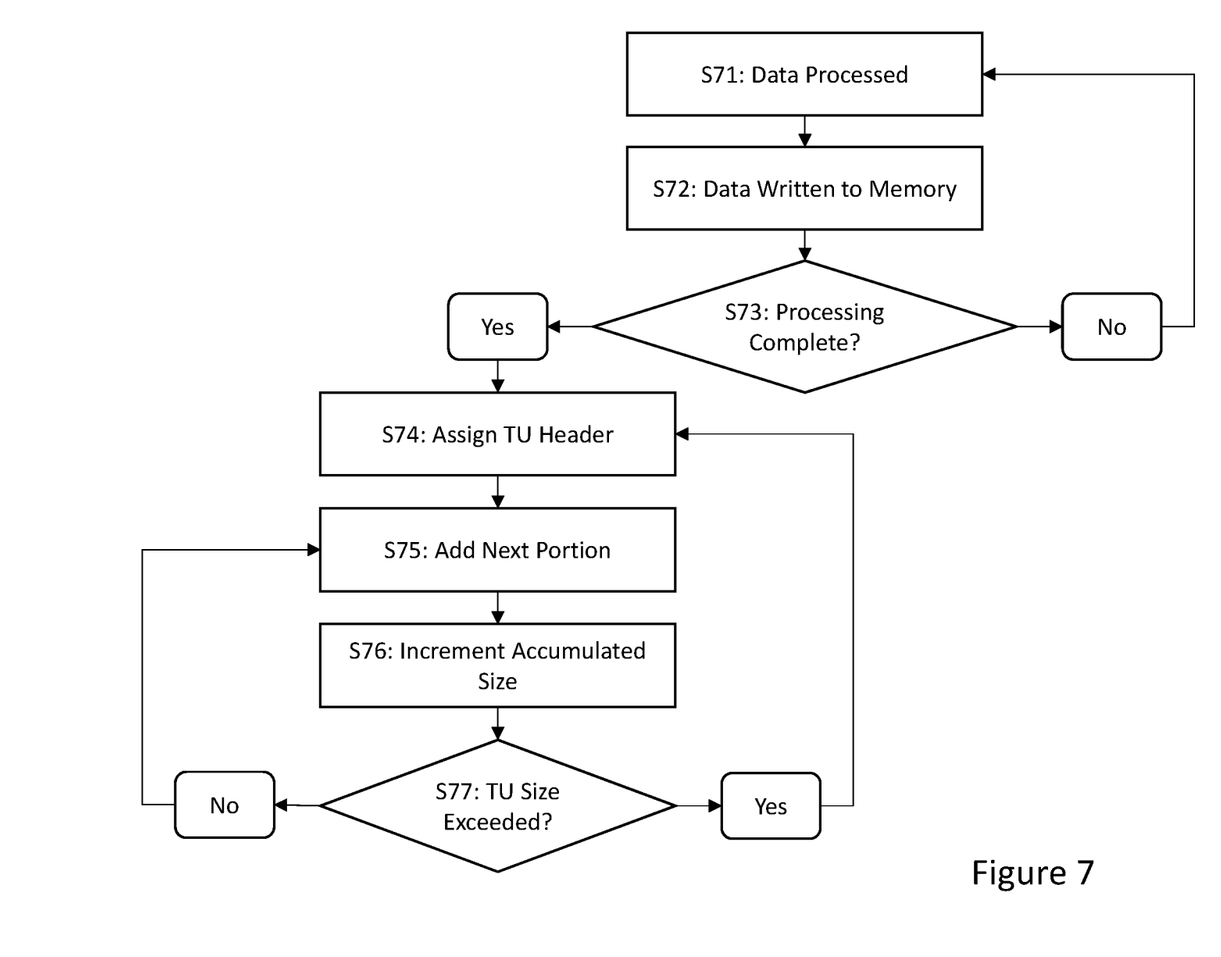
FIG. 7 shows a flow diagram of an alternative embodiment of the invention.

FIG. 7 shows an alternative process followed by a different embodiment of the invention, also with reference to FIG. 5, using bulk storage data as an example. In this process, however, the actual TU headers are not inserted until processing is complete. The data will therefore only include potential TU headers, there will be no pointers [52] in memory when the process begins, and when the process begins the accumulated size [53] will be 0.

At Step S71, a portion of data is taken from the input buffer [16]. This may be, for example, the next 1 KB of data being transmitted. It is then processed—in this embodiment, encoded—and written to memory in the output buffer [18] at Step S72, leaving a potential TU header between itself and the previous portion of processed data.

At Step S73, the execution unit [14] determines whether processing is complete for the input; for example, if all the data to be transmitted has been processed, or if processing is complete for a single file. If not, the process returns to Step S71 and the encoder [17] fetches the next portion of data from the input buffer [16].

If processing is complete, the process moves to Step S74. The first potential TU header in the output buffer [18] is replaced with an actual TU header [51A] and the address of the new actual TU header [51A] is stored as a pointer [52A] in memory. This creates a new TU. The execution unit [14] adds the first processed portion of data to the new TU at Step S75, at this stage by adding its size to the accumulated size variable [53] at Step S76.

The first TU header [51A] may in fact have been assigned at the beginning of processing since there will be at least one TU in the output buffer [18]. However, all other TU headers will be assigned as part of this process.

At Step S77, the execution unit [14] determines whether the predetermined maximum TU size [54] has been exceeded; i.e. whether the accumulated size [53] is greater than the maximum TU size [54]. This should not be the case for the first portion of processed data [51Ai], and at any point if the only portion of processed data in a TU is too large for a TU it may be an indication that the data should be returned to the encoder [17] for re-encoding with different parameters.

If the accumulated size [53] is not larger than the maximum TU size [54], as is the case for the second portion of processed data [51Aii] shown in FIG. 5, the process returns to Step S75 and the execution unit [14] adds the next portion of processed data [51Aii] to the set comprising the current TU by leaving the potential TU header between the first [51Ai] and second [51Aii] portions of processed data as it is. It then increments the accumulated size [53] by the size of the second portion of processed data [51Aii] at Step S76 and at Step S77 it once again determines whether the accumulated size [53] is greater than the maximum TU size [54].

If the accumulated size [53] is not greater than the maximum TU size [54], the process once again returns to Step S75 and continues repeating until the accumulated size [53] exceeds the maximum TU size [54] or there is no more data in the output buffer [18].

If the accumulated size [53] does exceed the maximum TU size [54], as would be the case when the execution unit [14] adds the third portion of processed data [51Bi] to the TU [51A], the process returns to Step S74 and the execution unit [14] converts the potential TU header at the beginning of the last portion of processed data added to the set—in this case, the third portion of processed data [51Bi]—into an actual TU header, thus creating a new TU [51B] beginning with the third portion of processed data [51Bi]. It therefore also resets the accumulated size [53] to be the size of the third portion of processed data [51Bi] and therefore the current total size of the new TU [51B] and stores the location of the new actual TU header in memory as a second pointer [52B].

The process then continues to iterate through Steps S74-S77 until all the data in the output buffer [18] has been divided into TUs.

Whichever method is used, once processing and delimitating into TUs is complete, the output engine [15] fetches the processed data and transmits the TUs to the client device [12], preferably encapsulated in appropriate packets.

Although only two particular embodiments have been described in detail above, it will be appreciated that various changes, modifications and improvements can be made by a person skilled in the art without departing from the scope of the present invention as defined in the claims.

We claim the following:

1. A method of managing data, the method comprising:
   receiving an amount of data at a host device, wherein the data is to be processed and encapsulated into transport units having a maximum size for transport over a transmission medium to a client device;
   storing the data in an input buffer, the data being divided into a plurality of portions;
   processing each portion of the data into processed portions of the data of varying size;
   storing the processed portions sequentially into an output buffer to form the transport units, wherein the processed portions are stored with a potential start field space left between the processed portions in the output buffer;
   determining a set of the sequential processed portions stored in the output buffer, the set starting after a previous actual start field wherein the set has a size that does not exceed the maximum size, based on sizes of the sequential processed portions stored in the output buffer, wherein the set comprises at least one processed portion; and
   replacing a potential start field space after a last of the sequential processed portions in the determined set by an actual start field to define the set of the sequential processed portions as being of less than the maximum size for a transport unit, wherein the set of sequential processed portions in the output buffer delimited by actual start fields is output over the transmission medium.

2. The method of claim 1, wherein determining the set of the sequential processed portions comprises, after each processed portion is stored in the output buffer:
   in response to determining that a size of a newly processed portion stored in the output buffer, together with sizes of previously stored sequential processed portions stored in the output buffer after a previous actual start field exceeds the maximum size, and, replacing the potential start field space immediately prior to the newly processed portion stored in the output buffer with the actual start field.

3. The method of claim 1, wherein determining the set of the sequential processed portions comprises:
   starting at the actual start field, determining a cumulative size of the sequential processed portions, until the cumulative size exceeds the maximum size; and
   replacing, with the actual start field, the potential start field space immediately prior to a last processed portion stored in the output buffer whose size was added to the cumulative size to cause the cumulative size to exceed the maximum size.

4. The method of claim 1, further comprising storing information in a memory, the information indicating, for each set of sequential processed portions, a position of each actual start field for the set, and a position of an end of the set in the output buffer.

5. The method of claim 1, wherein the portions of the data are divided into groups, wherein each of the portions of the data in each of the groups is processed sequentially and is stored in the output buffer sequentially in a section of the output buffer, and wherein each of the groups of the portions of the data is processed in parallel and is stored in a separate section of the output buffer.

6. The method of claim 1, wherein the data comprises display data, the amount of the data comprises a frame of image data, the client device is a display device for displaying the frame of the image data and the method is performed at a Graphics Processing Unit (GPU).

7. The method of claim 6, wherein processing sequentially comprises processing using an encoding algorithm to provide an encoded portion of the data.

8. The method of claim 7, wherein the actual start field comprises a header.

9. A processing unit comprising a processor configured to:
   receive an amount of data, wherein the data is to be processed and encapsulated into transport units having a maximum size for transport over a transmission medium to a client device;
   store the data in an input buffer, the data being divided into a plurality of portions;
   process each portion of the data into processed portions of the data of varying size;
   store the processed portions sequentially into an output buffer to form the transport units, wherein the processed portions are stored with a potential start field space left between the processed portions in the output buffer;
   determine a set of the sequential processed portions stored in the output buffer, the set starting after a previous actual start field wherein the set has a size that does not exceed the maximum size, based on sizes of the sequential processed portions stored in the output buffer, wherein the set comprises at least one processed portion; and
   replace a potential start field space after a last of the sequential processed portions in the determined set by an actual start field to define the set of sequential processed portions as being of less than the maximum size for a transport unit, wherein the set of processed portions in the output buffer delimited by actual start fields is output over the transmission medium.

10. The processing unit of claim 9, wherein the processing unit is a Graphics Processing Unit (GPU).

11. A host device comprising the processing unit of claim 10, a Central Processing Units (CPU) and an output transport mechanism.

12. The host device claim 11, wherein the CPU is configured to encapsulate the set of the sequential processed portions of the data that include encoded display data into the transport units and to output the transport units to a display device over the transmission medium.

13. A system for managing display data comprising the host device of claim 12 and a display device coupled to the host device by the transmission medium, wherein the display device comprises means configured to:
- receive the portions of the display data via the transmission medium from the host device;
- decode the portions of the encoded display data; and
- output the decoded display data for display.

14. The system claim 13, wherein the display device comprises a pair of display panels for displaying a frame of the display data, wherein the display device and the pair of display panels are incorporated in a wearable headset.

15. The system of claim 14, wherein the wearable headset comprises a virtual reality or an augmented reality headset.

16. The processing unit of claim 9, wherein the processor is configured to determine the set of the sequential processed portions by, after each processed portion is stored in the output buffer:
- in response to determining that a size of a newly processed portion stored in the output buffer, together with sizes of previously stored sequential processed portions stored in the output buffer after a previous actual start field exceeds the maximum size replacing the potential start field space immediately prior to the newly processed portion stored in the output buffer with the actual start field.

17. The processing unit of claim 9, wherein the processor is configured to determine the set of the sequential processed portions by:
- starting at the actual start field, determining a cumulative size of the sequential processed portions, until the cumulative size exceeds the maximum size for a transport unit; and
- replacing, with the actual start field, the potential start field space immediately prior to a last processed portion stored in the output buffer whose size was added to the cumulative size to cause the cumulative size to exceed the maximum size.

18. The processing unit of claim 9, wherein the processor is further configured to store information in a memory, the information indicating, for each set of the sequential processed portions, a position of each actual start field for the set, and a position of an end of the set in the output buffer.

19. The processing unit of claim 9, wherein the portions of the data are divided into groups, wherein the processor is further configured to process each of the portions of the data in each of the groups sequentially and store in the output buffer sequentially in a section of the output buffer, and wherein the processor is further configured to process each of the groups of the portions of the data in parallel and store each of the groups in a separate section of the output buffer.

* * * * *